United States Patent [19]
Stangeland et al.

[11] Patent Number: 5,663,732
[45] Date of Patent: Sep. 2, 1997

[54] INTEGRITY MONITORING METHOD AND APPARATUS FOR GPS AND DGPS RECEIVERS

[75] Inventors: Rodney L. Stangeland, Plymouth, Minn.; Wayland K. Adams, Glendale, Ariz.

[73] Assignee: Honeywell Inc., Minneapolis, Minn.

[21] Appl. No.: 450,047

[22] Filed: May 25, 1995

[51] Int. Cl.$^6$ ............... G01S 5/02; G01C 21/00; G06F 7/70
[52] U.S. Cl. .............. 342/357; 340/979; 701/213
[58] Field of Search ................... 342/357, 457; 364/424.06; 340/979

[56] References Cited

U.S. PATENT DOCUMENTS

| | | | |
|---|---|---|---|
| 4,567,483 | 1/1986 | Bateman et al. | 340/970 |
| 5,461,388 | 10/1995 | Applegate et al. | 342/357 |
| 5,488,559 | 1/1996 | Seymour | 342/357 |

OTHER PUBLICATIONS

Vallot et al, "Design and Flight Test for a Differential GPS/Inertial Navigation System for Approaching/Landing Guidance", Navigation: Journal of the Inst. of Nav., vol. 38, #2, Summer 1991.

Matts Brenner application entitled "Differential Satellite Positioning System Ground Station With Integrity Monitoring," Ser. No. 08/497,995 file date Jun. 30, 1995.

*Primary Examiner*—Gregory C. Issing
*Attorney, Agent, or Firm*—Charles J. Ungemach

[57] ABSTRACT

A fail safe GPS system for an aircraft moving along a desired trajectory within vertical and horizontal limits using first and second redundant GPS receivers a first of which is connected to the avionics equipment of the aircraft and to an alarm and the second of which is connected only to the alarm so that if a malfunction in the flight management system occurs both GPS's will cause the alarm and if a malfunction in the first GPS system occurs, so that the aircraft exceeds the vertical or horizontal limits, the second GPS system will cause the alarm.

6 Claims, 1 Drawing Sheet

INTEGRITY MONITORING METHOD AND APPARATUS FOR GPS AND DGPS RECEIVERS

BACKGROUND OF INVENTION

1. Field of the Invention

The present invention relates to position control and more particularly to the control of aircraft utilizing signals from Global Position Systems (GPS) and Differential Global Position Systems (DGPS).

2. Description of the Prior Art

GPS and DGPS systems are well known in the art. GPS systems utilize a number of orbiting position transmitting satellite stations and a receiver on the aircraft to determine the position of the aircraft with respect to ground. With the received information from the satellites, the receiver can determine a number of aircraft parameters such as position, speed and even attitude. DGPS systems utilize the basic GPS system and the orbiting position transmitting satellite stations but also uses one or more ground receiver systems to greatly improve the accuracy of the GPS information to the aircraft. Because the ground station position can be precisely known, any errors which may occur in the transmission from the orbiting satellites can be checked and a signal sent to the aircraft indicating the errors so that the airborne receiver can modify the signals it receives from the satellites and determine the aircraft parameters to a high degree of precision. GPS without ground station modification are used primarily for aircraft travel between airfields while DGPS systems are used primarily for travel around airfields, for precision landings and for missed approaches etc.

There is always concern about the amount of confidence that can be attributed to a GPS or DGPS position determination and accordingly systems have been developed to provide information as to the integrity of the signals. In a system identified as RAIM (Receiver Autonomous Integrity Monitor), the integrity of a GPS signal has been heretofore determined. For example, using RAIM, it can be calculated that the position signal from the airborne receiver has a certain high percentage, (say 99.9%) chance of being within a certain distance (say one third nautical mile or about 2,025 feet) of the actual position. This is satisfactory for aircraft flying between airfields, but not accurate enough for near airfield positions, particularly during precision landings. Federal guidelines have been established for aircraft of different sizes and different altitudes which create a sort of "tunnel" that an aircraft must be within and with an integrity of 99.9% for long distance travel and with an integrity of 1 part in $10^{-7}$ or of about 99.9999999 for precision landings. For example, Federal guidelines may require an aircraft in a precision landing mode at 200 feet altitude, to be within 110 vertical feet era desired trajectory and within 425 horizontal feet of the desired trajectory with an integrity of 99.9999999%.

Honeywell has developed a system with sufficient accuracy and integrity to enable automatic precision landings in most instances. This system is described and claimed in an application of Mats Brenner entitled Differential Satellite Positioning System Ground Station with Integrity Monitoring filed Jun. 30, 1993 Ser. No. 08/497,895 and assigned to the assignee of the present invention. In the Brenner system, the position of an aircraft as determined by the DGPS, may have the high 99.9999999% integrity for a much smaller distance (say 30 feet) than has heretofore been possible. This allows aircraft to be controlled mound airfields and in precision landing modes with sufficient accuracy to meet the Federal guidelines.

In either the RAIM or the Brenner DGPS system, a possible problem is encountered. Assume, that an aircraft is moving along a prescribed path and the position is determined to be within X number of feet of the actual position with a certain confidence level and a malfunction occurs. If the malfunction is in the aircraft controls (such as the autopilot or servos of the aircraft or the flight management system) the aircraft may start flying off of the prescribed course. However, when its position becomes outside the tunnel determined by the Federal guidelines, the GPS or DGPS can be programmed to produce a signal which will cause an alarm to alert the pilot to the malfunction and to permit him to disengage the auto pilot to move back into the tunnel. However, if a malfunction occurs in the GPS or the DGPS, the aircraft could fly off the prescribed course and the GPS or DGPS would not detect it in which case no alarm would be given. This would be particularly hazardous during precision landings.

Standard fail safe systems could be employed which would add a second parallel GPS or DGPS and compare the outputs of the two parallel systems so that if they differed, then a malfunction would be presumed and an alarm would be given. Such fail safe systems require not only duplication of the measuring apparatus but also the use of a comparator which introduces the problem that the comparator itself may malfunction. Triple redundant systems can reduce this problem to a very low level of probability but further duplicate measuring systems are needed and the result is exceedingly costly in equipment, weight and space.

BRIEF DESCRIPTION OF THE PRESENT INVENTION

The present invention overcomes the problem of the prior art by using a first GPS or DGPS to provide information to control the aircraft or display its position through the autopilot or flight management system and a second GPS or DGPS which acts to check on the first GPS or DGPS but not to control the aircraft. Both GPS's or DGPS's are also connected to an alarm so that if either one malfunctions, the alarm will be activated. With this arrangement, if a malfunction occurs in the aircraft control, both GPS's or DGPS's will detect that the aircraft is moving outside the tunnel and both will activate the alarm. If the first GPS or DGPS malfunctions to cause the aircraft to move outside the tunnel without the first GPS or DGPS knowing, the second DGPS will activate the alarm. If the second GPS or DGPS malfunctions so that the aircraft moves outside the tunnel without the second GPS or DGPS knowing, the first GPS or DGPS will activate the alarm. If either GPS or DGPS malfunctions in a way that does not cause the aircraft to leave the tunnel, although no alarm may sound, it makes no difference since the aircraft remains within the tunnel as desired.

DETAILED DESCRIPTION OF THE PREFERRED EMBODIMENT

Figure 1:
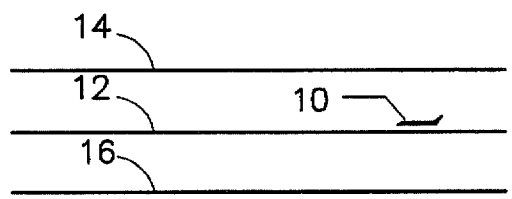
FIG. 1 shows a flight path which might exist for an aircraft flying between airports.

In FIG. 1, an aircraft 10 is shown flying along a flight path or desired trajectory 12 as might be the case where the flight is between two airports or terminals.

A line 14 representing an upper altitude limit is shown above trajectory 12 and a line 16 representing a lower altitude limit is shown below trajectory 12. Altitude limit lines 14 and 16 may be those established by the Federal guidelines and constitute the vertical limits between which the craft should fly. Similar side limit lines (not shown) into and out of the plane of the paper are also established by Federal guidelines to establish side to side or lateral limits between which the aircraft should fly. Accordingly, a rectangular tunnel is created in which the aircraft should fly. If the aircraft position exceeds the upper, lower or sides of this tunnel, a warning should sound to alert the pilot so he can disengage any automatic control of the aircraft and bring it back into the tunnel.

Figure 2:
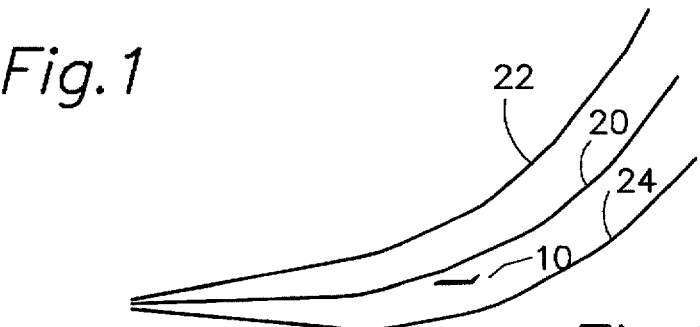
FIG. 2 shows a flight path which might exist for an aircraft landing at an airport.

In FIG. 2, the aircraft 12 is shown flying in a downwardly direction along a precision landing trajectory 20 from a higher altitude at the fight to a lower altitude at the left. Altitude limit lines 22 and 24, which may be those established by the Federal guidelines, constitute the upper and lower limits between which the craft should fly during it descent. Similar lateral limit lines (not shown) into and out of the plane of the paper establish horizontal limits between which the aircraft should fly during its descent. Accordingly, a rectangular tunnel is created in which the aircraft should fly for a precision landing approach. If the aircraft position exceeds the upper, lower or lateral limits of this tunnel, a warning should be given to allow the pilot to take over any automatic control of the aircraft and bring it back into the tunnel or abort the landing. Whereas in FIG. 1, the vertical and lateral limits may be relatively constant, it will be seen that in FIG. 2, the vertical limit lines 22 and 24 converge toward the desired trajectory 20 as the aircraft moves to lower and lower altitudes. Similar convergence may occur for the lateral limit lines (not shown). This convergence is required since the amount of acceptable variation in position decreases as the aircraft moves closer to the ground. Because significant improvement in accuracy and integrity is required for precision landing, the DGPS system in the above mentioned Brenner application will be preferred.

Figure 3:
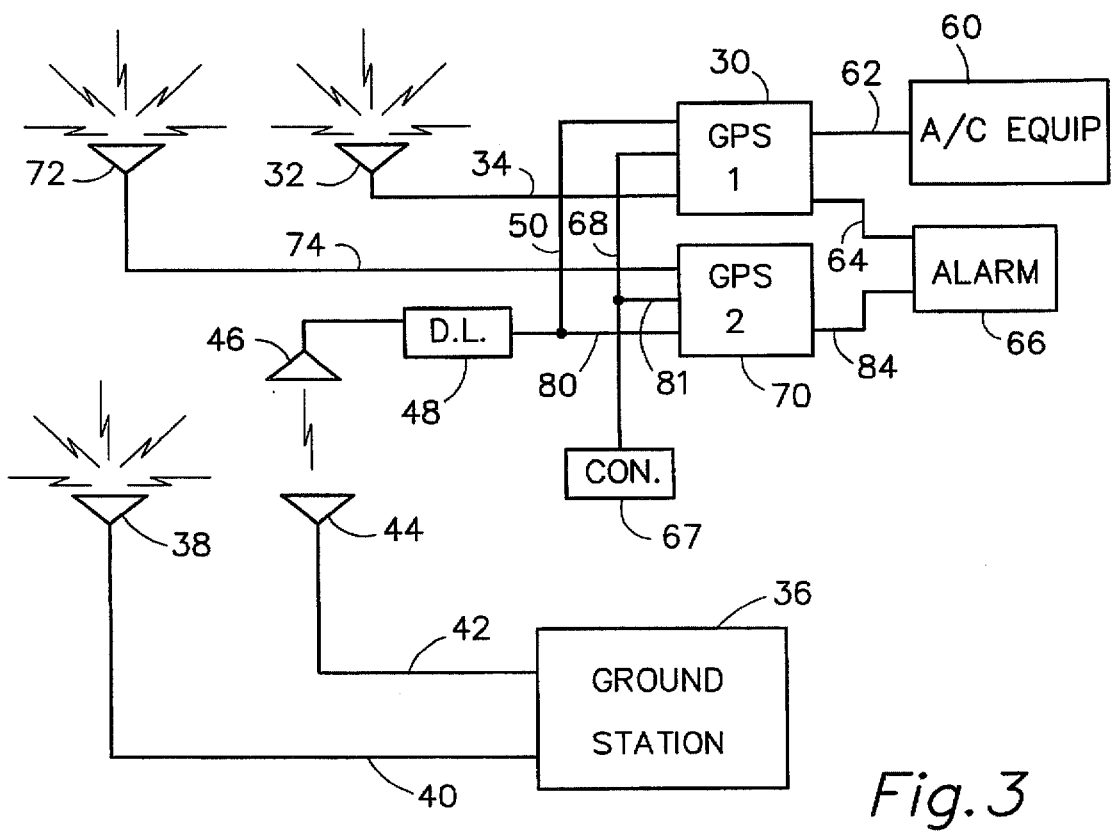
FIG. 3 shows a schematic diagram of the fail safe system according to the present invention.

In FIG. 3, a first GPS receiver 30 is shown receiving a transmission from a plurality of satellites via antenna 32 and a connection 34. GPS 30 is shown as part of a DGPS system and, accordingly, a ground station 36 is shown which receives the transmission from the satellites via an antenna 38 and a connection 40. Ground station 36 will compute any errors in the transmissions from the satellites and will send any such error information via line 42 to an antenna 44 where it is transmitted to a receiving antenna 46 on board the aircraft. The error information from antenna 46 is presented through a data link 48 and a connection 50 to the GPS 30. GPS 30 operates on the signals received to calculate a position and then compares the position so determined with the limit lines established by Federal guidelines. This comparison may be performed in a standard way such as a look up table.

Assume, for example, that the altitude of the desired trajectory 12 in FIG. 1 is 30,000 feet with the upper altitude limit line at 33,000 feet and a lower altitude limit line at 27,000 feet established by the Federal guidelines. Also assume that the GPS system employed is a RAIM system which has a 2,025 foot altitude variance with a 99.9% integrity. If the GPS 30 determines the position of the aircraft 10 to be at 30,050 feet within an error limit of 2,025 feet, with a 99.99% certainty, then the aircraft is practically assured of being below the upper altitude limit. The signal from GPS 30 is presented to the aircraft equipment 60 which may be the aircraft autopilot, the flight management system and/or various display apparatus on the aircraft. If the output of the GPS indicated that the aircraft 10 was at 31,900 feet, then with a possible error of 2025 feet, the aircraft 10 might be above the upper altitude limit and to be safe an alarm should sound. To this end, a second output of GPS 30 is shown on line 64 connected to alarm 66. When a limit is exceeded, although the signal on line 36 to autopilot 34 continues, a signal on line 64 will activate the alarm 60 as to light a hazard light or an audible sound device. Accordingly, it is seen that as long as the aircraft remains within the tunnel, the information from the GPS 30 may be used for controlling the aircraft but as soon as it leaves the tunnel the pilot is warned to take over the controls and return to the tunnel.

If the aircraft 10 was on a precision landing, then the flight path along trajectory 20 of FIG. 2 would be used with an upper altitude limit which might vary from 200 feet above and below the trajectory line 20 at the higher altitudes to perhaps, 30 feet above and below the trajectory line 20 at lower altitudes. In such case, the DGPS of the above mentioned Brenner application would be used but otherwise the operation would be the same although the amount of allowable variance decrease would have to be programmed into the GPS 30 as the aircraft flew lower.

In order to provide the GPS with information as to the desired trajectory, a control circuit 67 is shown providing an input to GPS 30 via connection 68. Alternately, the flight management system on the aircraft which has the information for its use in controlling the aircraft can be connected back to the GPS 30 to supply the desired trajectory and vertical and lateral limit information thereto.

If a malfunction occurs in the aircraft 10, for example, in the aircraft component 60 of FIG. 3 then the aircraft might start moving away from the desired trajectory 12 or 20. When it moved far enough, the GPS 30 would detect the limit had been reached and would produce the alarm via line 64. However, if a malfunction occurs in GPS 30, the aircraft might fly off course and GPS 30 might not detect the error. Accordingly, in FIG. 3, a second GPS 70 is shown having its antenna 72 connected to receive the signals from the satellites and transmit them via line 74. For the accurate systems, the differential ground station 36 will also send the error information via antennas 44 and 46 through data link 48 and a connection 80 to GPS 70. GPS 70 also receives the desired trajectory and vertical and lateral limit information from the control circuit 67 by way era connection 81. GPS 70 may now independently calculate the aircraft position and compare it to the desired trajectory so as to produce an alarm signal output on a connection 84 to the alarm 66. If the aircraft stays within the limits defined by the lines 14 and 16 or lines 22 and 24, no signal from GPS 70 will occur since it is not connected to the aircraft equipment 60.

Now if there is a malfunction in the aircraft equipment which causes the aircraft to leave the tunnel, both GPS 30 and 70 will respond to activate alarm 66. If GPS 30 fails and the aircraft leaves the tunnel without GPS 30 noticing, GPS 70 will detect the error and activate the alarm 66. If GPS 70 malfunctions, the aircraft would not change course since GPS 70 is not connected to the aircraft equipment 60 and although the alarm 66 might not be activated, no harm would result since GPS 30 would be correct and the aircraft would stay within the tunnel. While it is theoretically possible for both GPS 30 and 70 to fail in exactly the same way at the same time, it is beyond the normally accepted probabilities and need not be provided for under normal conditions. Of course, additional GPS systems could be connected in parallel with those described, to take care of this remote possibility and provide addition safety. An additional GPS system could also be used to create a "fail operational" system where upon a failure of one GPS, the control signals to the aircraft will continue to be correct as long as the other two GPS outputs agree.

Accordingly, it is seen that 1 have provided a fail safe system that does not require a separate comparator to check the outputs of GPS 30 and 70. This saves considerable expense, complexity, weight and space.

Many improvements will occur to those skilled in the art and I do not wish to be limited to the disclosure used in connection with the preferred embodiments I, therefore, intend to be limited only by the appended claims.

The embodiments of the invention in which an exclusive property or right is claimed are defined as follows:

1. In combination with an aircraft being controlled to move along a desired trajectory:

a first GPS system operable to receive signals from a plurality of satellites and to produce a first signal indicative of the aircraft position and a second signal indicative of a departure of the aircraft from a desired trajectory which is greater than a predetermined amount;

a second GPS system operable to receive signals from the plurality of satellites and to produce a first signal indicative of the aircraft position and a second signal indicative of the departure of the aircraft from a desired trajectory which is greater than the predetermined amount;

means transmitting only one of the first signals to the aircraft to provide position information thereto;

an alarm; and means transmitting the second signal of both the first and second GPS systems to the alarm so that an alarm will occur whenever the aircraft departs from the desired trajectory by more than the predetermined amount.

2. Apparatus according to claim 1 further including means to provide the first and second GPS systems with information pertaining to the desired flight path and the limits defining the predetermined amount.

3. Apparatus according to claim 1 wherein the first and second GPS systems are DGPS systems.

4. Apparatus according to claim 3 further including means to provide the first and second DGPS systems with information pertaining to the desired flight path and the limits defining the predetermined amount.

5. A method of providing an alarm signal when an aircraft having two GPS receivers and avionic equipment moves out of a predetermined airspace around a desired trajectory comprising the steps of:

A) encoding limits of the predetermined airspace in the two GPS receivers;

B) determining the position of the aircraft in both GPS receivers and,

C) comparing the position determined in step B) with the encoded limits of step A) and producing an alarm signal when the comparison indicates the aircraft is out of the predetermined airspace.

6. The method of claim 5 including the further step of:

D) Connecting only one of the GPS receivers to the avionic equipment to provide the aircraft with the position determined in step B.

\* \* \* \* \*